UNITED STATES PATENT OFFICE.

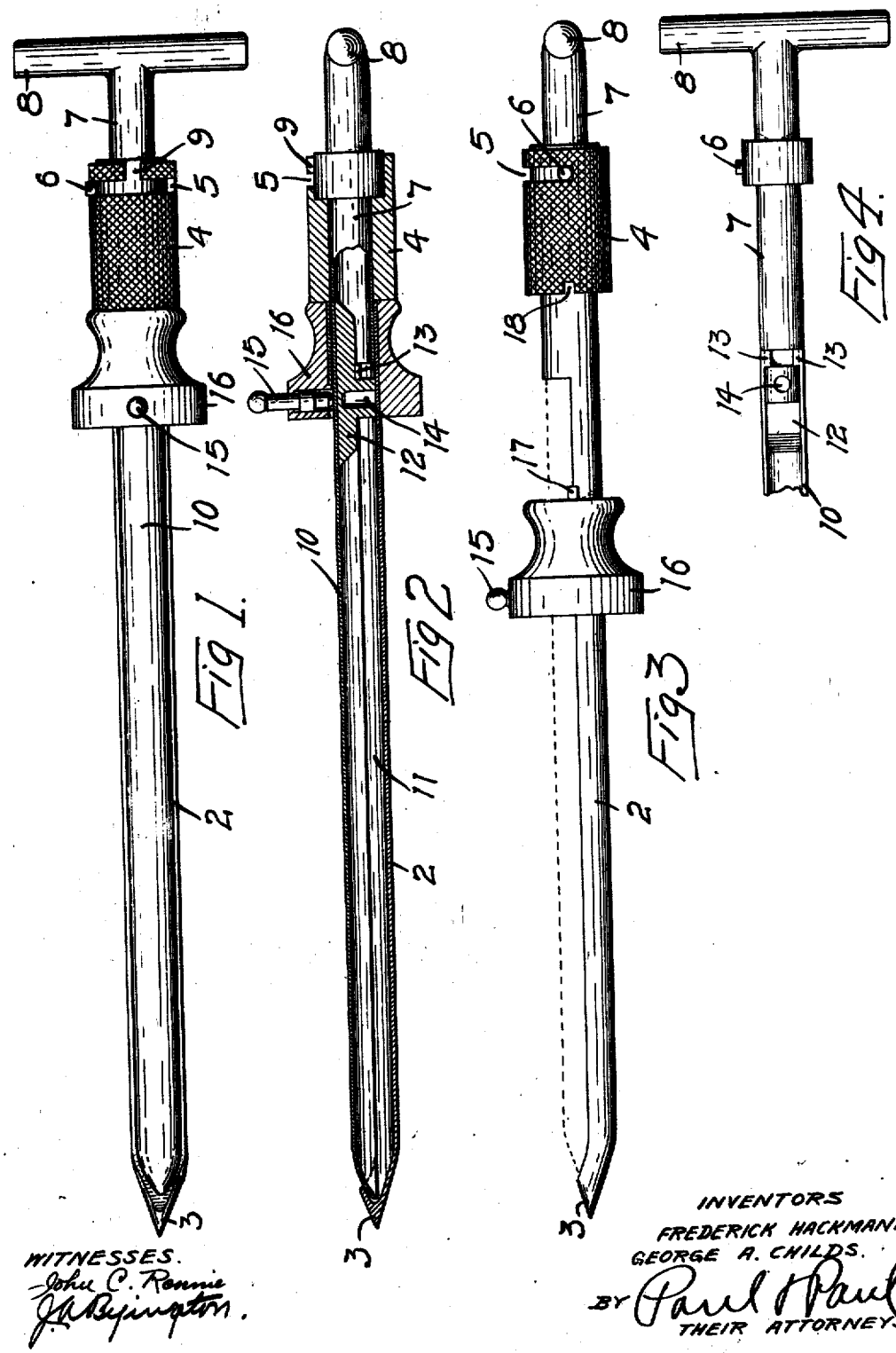

FREDERICK HACKMANN, OF ST. PAUL, AND GEORGE A. CHILDS, OF MINNEAPOLIS, MINNESOTA, SAID HACKMANN ASSIGNOR TO SAID CHILDS AND HENRY L. GIFFORD, OF MINNEAPOLIS, MINNESOTA.

MEAT-SALTER.

No. 921,980.      Specification of Letters Patent.      Patented May 18, 1909.

Application filed November 14, 1908. Serial No. 462,738.

To all whom it may concern:

Be it known that we, FREDERICK HACKMANN, of St. Paul, Ramsey county, Minnesota, and GEORGE A. CHILDS, of Minneapolis, Hennepin county, Minnesota, have invented certain new and useful Improvements in Meat-Salters, of which the following is a specification.

The object of our invention is to provide a tool, by means of which salt or a preparation including salt and other preservatives may be injected into a ham, the purpose being to save time and labor usually required to perform this operation.

The invention consists generally in a tool, adapted to contain a quantity of salt or similar material and having means, which, when the tool is inserted into the meat, can be utilized to eject the salt.

In the accompanying drawings forming part of this specification, Figure 1 is a view of a tool, embodying our invention. Fig. 2 is a sectional view, illustrating the device for ejecting the salt from the tool. Fig. 3 illustrates the ejecting device in operation. Fig. 4 is a detail view of the handle portion of the tool.

In the drawings, 2 represents a shank portion, having a pointed end 3, for insertion into the meat. The shank is provided with a hand grip 4, having a transverse slot 5, to receive a pin 6 on a shank 7, which has an operating handle 8. A slot 9 leads into the transverse slot 5 and permits the separation of the hand grip and the pin 6. A part 10 is attached to the shank 7 and has the functions of a cover for closing a longitudinal chamber 11 that is formed in the shank 2 and wherein the salt or other preservative in dry form is placed. When the cover 10 is rotated to close the chamber 11, the device will assume a cylindrical form and can easily and quickly be thrust into the meat to be salted. Within the cover 10 we provide an ejector 12, held by flanges 13 and have a socket 14 to receive a locking pin 15 that is carried by a collar 16. This pin holds the ejector when the shank is drawn out. After the tool is inserted into the meat, the cover is rotated until it rests within the chamber 11 and between the salt and the walls of said chamber. At that time, the operator, grasping the handle 8, may draw the shank outward and holding the collar 16 firmly with the other hand, the ejector will engage the salt in the chamber 11 and force it therefrom against the meat. We are thus able to expel dry salt or other preservative from the chamber of the shank without any delay in the operation of the tool. As soon as the salt is ejected, the parts may be re-assembled, the chamber filled again and the tool thrust into another ham and the operation repeated.

We prefer to provide lugs 17 on the collar 16 to enter recesses 18 in the hand grip 4, thereby preventing the collar from turning prematurely.

When desired, the pin 15 may be withdrawn from its socket in the ejector and the parts easily and quickly separated.

We claim as our invention:

1. A meat salter, comprising a shank, having a pointed end and a longitudinal chamber adapted to be filled with salt, semi-cylindrical means for closing said chamber when the device is thrust into the meat and means operating longitudinally in said semi-cylindrical means for ejecting the salt.

2. A meat salter, comprising a shank, having a pointed end and a longitudinal chamber adapted to be filled with salt, a cover semi-cylindrical in form, for closing said chamber when the device is thrust into the meat, said cover being adapted to be rotated and fit within the chamber in said shank between its walls and the salt, and a salt ejecting device.

3. A meat salter, comprising a shank, having a pointed end and a longitudinal chamber adapted to be filled with salt, means for closing said chamber when the device is thrust into the meat, said closing means having a hand grip and means for temporarily locking it on said shank, and a salt ejector provided in said chamber and on which said shank is adapted to slide when it is withdrawn from the meat said ejector operating longitudinally in said chamber to discharge the salt.

4. A meat salter, comprising a shank, semi-cylindrical in form and having a pointed end adapted to contain a quantity of salt, an ejector provided in said shank and operating longitudinally therein, a collar therefor having a locking pin and means for closing the open side of said shank when it is thrust into the meat.

5. A meat salter, comprising a shank, having a chamber to receive salt and a pointed end and a handle at its opposite end, a cover semi-cylindrical in form having a hand grip mounted on said shank, said hand grip and cover having a limited rotary movement on said shank and said cover passing between said shank and the salt therein when the cover is rotated, and a salt ejector provided in said shank and operating longitudinally therein and having means for preventing premature rotary movement thereof.

6. A meat salter, comprising a shank semi-cylindrical in form having a pointed end and adapted to contain a quantity of salt, a cover device arranged to close said chamber and prevent the escape of the salt therefrom when the shank is thrust into the meat said shank and cover device having a relative longitudinal movement, and a salt ejector provided in said cover device, substantially as described.

7. A meat salter, comprising a shank having an end adapted to be thrust into the meat, and a longitudinal chamber adapted to be filled with salt, a cover semi-cylindrical in form for closing said chamber when the device is thrust into the meat, said cover adapted to be rotated and fitting within the chamber between its walls and the salt, and said shank and cover having a relative longitudinal movement and an ejecting device operating lengthwise in said cover, for the purpose specified.

8. A device of the class described, comprising a shank having an end adapted to be inserted into the meat and provided with a longitudinal chamber, means fitting within said chamber and provided with an operating handle and having a rotary movement in said chamber to close the open side of the same during the operation of thrusting the tool into the meat, said closing means being also capable of withdrawal longitudinally from said chamber during the operation of ejecting the contents of the chamber, and an ejecting device operating lengthwise in said closing means.

In witness whereof, we have hereunto set our hands this 11th day of November 1908.

FREDERICK HACKMANN.
GEORGE A. CHILDS.

Witnesses:
RICHARD PAUL,
J. A. BYINGTON.